United States Patent
Min et al.

(10) Patent No.: US 9,120,087 B2
(45) Date of Patent: Sep. 1, 2015

(54) CATALYST FOR FUEL CELL, METHOD FOR PREPARING THE SAME, AND MEMBRANE-ELECTRODE ASSEMBLY AND FUEL CELL SYSTEM COMPRISING SAME

(75) Inventors: Myoung-Ki Min, Suwon-si (KR); Chan-Hee Park, Suwon-si (KR); Hye-A Kim, Suwon-si (KR); Chan Kwak, Suwon-si (KR); Ho-Jin Kweon, Suwon-si (KR); Hasuck Kim, Seoul (KR)

(73) Assignees: Samsung SDI Co., Ltd., Giheung-gu, Yongin-si, Gyeonggi-do (KR); Hasuck Kim, Seoul (KR)

( * ) Notice: Subject to any disclaimer, the term of this patent is extended or adjusted under 35 U.S.C. 154(b) by 2409 days.

(21) Appl. No.: 11/260,471

(22) Filed: Oct. 28, 2005

(65) Prior Publication Data

US 2006/0093892 A1 May 4, 2006

(30) Foreign Application Priority Data

Oct. 28, 2004 (KR) ........................ 10-2004-0086631

(51) Int. Cl.
*H01M 4/92* (2006.01)
*B01J 23/89* (2006.01)
*B01J 23/56* (2006.01)
*B01J 37/02* (2006.01)
*H01M 4/90* (2006.01)
*H01M 8/10* (2006.01)
*B01J 35/00* (2006.01)
*H01M 4/86* (2006.01)

(52) U.S. Cl.
CPC .............. *B01J 23/8906* (2013.01); *B01J 23/56* (2013.01); *B01J 37/0215* (2013.01); *H01M 4/90* (2013.01); *H01M 4/92* (2013.01); *H01M 4/921* (2013.01); *H01M 8/1004* (2013.01); *B01J 35/0013* (2013.01); *H01M 4/8657* (2013.01); *Y02E 60/521* (2013.01)

(58) Field of Classification Search
CPC ................................ H01M 4/92; H01M 4/921
USPC ............................. 429/40, 44, 487, 524, 527
See application file for complete search history.

(56) References Cited

U.S. PATENT DOCUMENTS

| 5,702,836 A | 12/1997 | Ma et al. |
|---|---|---|
| 6,447,943 B1 * | 9/2002 | Peled et al. ................... 429/494 |
| 6,528,201 B1 | 3/2003 | Hitomi |

(Continued)

FOREIGN PATENT DOCUMENTS

| CN | 1523695 | 8/2004 |
|---|---|---|
| EP | 0 450 849 | 10/1991 |

(Continued)

OTHER PUBLICATIONS

McGraw-Hill Dictionary of Scientific and Technical Terms-Second Edition, "electroless plating" p. 521.
"Synthesis and Magnetic Studies of Uniform Iron Nanorods and Nanospheres" by Sang-Jae Park et al., Journal of American Chemical Society, 2000, 122, pp. 8581-8582.
"Colloidal cobalt nanoparticles: a highly active and reusable Pauson-Khand catalyst" by Sang-Wook Kim et al., Chemical Communications, 2001, pp. 2212-2213.

(Continued)

*Primary Examiner* — Tracy Dove
(74) *Attorney, Agent, or Firm* — Robert E. Bushnell, Esq.

(57) ABSTRACT

The present invention includes a catalyst for a fuel cell which contains a transition element core, and a surface layer that contains at least one selected from the group including platinum, a platinum-transition element alloy, and a combination thereof, and that exists on the surface of the core. The catalyst being prepared without a surfactant.

12 Claims, 9 Drawing Sheets

(56) References Cited

U.S. PATENT DOCUMENTS

| | | | |
|---|---|---|---|
| 6,670,301 B2* | 12/2003 | Adzic et al. | 502/185 |
| 7,205,255 B2* | 4/2007 | Yamamoto | 502/101 |
| 2007/0031722 A1* | 2/2007 | Adzic et al. | 429/44 |

FOREIGN PATENT DOCUMENTS

| | | |
|---|---|---|
| JP | 2001-118582 | 4/2001 |
| JP | 2002-231257 | 8/2002 |
| JP | 2003226901 A | 8/2003 |
| JP | 2005135900 A | 5/2005 |
| JP | 2005-196972 A1 | 7/2005 |

OTHER PUBLICATIONS

Japanese Notice of Allowance issued by Japanese Patent Office on Feb. 7, 2012 corresponding to JP Application No. 2005-314231 and Request for Entry attached herewith.

Hwang, Hye-Young, Verification Statement for Translation, English Translation of the specification contained in Korean Patent Application No. 2004-0086631, Sep. 14, 2009.

The Electrochemical Society, $214^{th}$ Meeting, Abstract #958, Platinum Monolayer Electrocatalysts: Synthesis, Structure and Activity of Ideal Pt Shells on Pd Cores.

* cited by examiner

100nm

100nm

CATALYST FOR FUEL CELL, METHOD FOR PREPARING THE SAME, AND MEMBRANE-ELECTRODE ASSEMBLY AND FUEL CELL SYSTEM COMPRISING SAME

CLAIM OF PRIORITY

This application makes reference to, incorporates the same herein, and claims all benefits accruing under 35 U.S.C. §119 from an application for CATALYST FOR FUEL CELL, METHOD FOR PREPARING THE SAME, AND MEMBRANE-ELECTRODE ASSEMBLY AND FUEL CELL SYSTEM COMPRISING SAME earlier filed in the Korean Intellectual Property Office on 28 Oct. 2004 and there duly assigned Ser. No. 10-2004-0086631.

BACKGROUND OF THE INVENTION

1. Field of the Invention

The present invention relates to a catalyst for a fuel cell, a method of preparing the same, and a membrane-electrode assembly and a fuel cell system including the same. More particularly, the present invention relates to a catalyst for a fuel cell capable of providing a high performance fuel cell, a method of preparing the same, and a membrane-electrode assembly and a fuel cell system including the same.

2. Description of the Related Art

A fuel cell is a power generation system for producing electrical energy through the electrochemical redox reaction of an oxidant and a fuel such as hydrogen or a hydrocarbon-based material such as methanol, ethanol, natural gas, or the like.

Representative exemplary fuel cells include a polymer electrolyte fuel cell (PEMFC) and a direct oxidation fuel cell (DOFC).

The direct oxidation fuel cell includes a direct methanol fuel cell which uses methanol as a fuel. The polymer electrolyte fuel cell is an environmental-friendly energy source for replacing a conventional energy source. It has advantages such as high power output density and energy conversion efficiency, operability at room temperature, and being downsized and closely sealed. Therefore, it can be applicable to a wide array of fields such as non-polluting automobiles, electricity generation systems, and portable power sources for mobile equipment, military equipment, and the like.

The fuel cell can be classified into a gas-type fuel cell and a liquid-type fuel cell depending on which kind of fuel is used.

The gas-type fuel cell, which generally uses hydrogen as a fuel, has an advantage of a high energy density, but it also has problems of needing to carefully handle hydrogen gas and requiring accessory facilities such as a fuel reforming processor for reforming methane or methanol, natural gas, and the like in order to produce hydrogen as the fuel gas.

On the contrary, a liquid-type fuel cell, which uses a liquid fuel, has a lower energy density than that of the gas-type fuel cell, but it has the advantages of easy handling of the liquid-type fuel, a low operation temperature, and no need for additional fuel reforming processors. Therefore, it has been acknowledged as an appropriate system for a portable power source for small and common electrical equipment.

In the above fuel cell, the stack that generates electricity substantially includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

In general, the anode and the cathode use platinum as a catalyst, in various types. Particularly, in a DOFC, a Pt catalyst that is not supported on a carrier is used to achieve a highly active membrane-electrode assembly. In a PEMFC, much work is being undertaken to obtain high cell efficiency by positioning the catalyst layer more closely adjacent to a membrane and reducing the thickness of the catalyst layer.

Nano-sized platinum catalysts are generally prepared using carbon or another carrier. However, since a catalyst in a direct methanol fuel cell is Pt black or a platinum alloy that is not supported, a material such as a surfactant should be used so as to prepare a nano-sized catalyst. However, in the case of using such a surfactant, a size of a catalyst particle can be controlled to a certain degree, but it is very costly. Particularly, an alloy catalyst is more difficult to prepare. It is also difficult to remove the surfactant from the resultant product completely and the removing process is complicated. The remaining surfactant may poison the catalysts. Even if the surfactant is removed completely, the prepared catalysts are not preferable in terms of utilization efficiency since they are instable and they aggregate to form a massive platinum particle catalyst.

SUMMARY OF THE INVENTION

An embodiment of the present invention provides a catalyst for a fuel cell having excellent efficiency.

Another embodiment provides a method of preparing the catalyst for a fuel cell.

Yet another embodiment of the present invention provides a membrane-electrode assembly for a fuel cell system containing the catalyst.

Still another embodiment of the present invention provides a fuel cell system containing the catalyst.

The embodiments provide the above and other features of the present invention.

An embodiment of the present invention provides a catalyst for a fuel cell which contains a transition element core and a surface layer that contains at least one selected from the group including platinum, a platinum-transition element alloy, and a combination thereof, and exists on the surface of the core.

Another embodiment of the present invention provides a method of preparing a catalyst for a fuel cell. The method includes the following processes: a water-soluble platinum solution and a non-water-soluble reducing agent are mixed or a water-soluble reducing agent and a non-water-soluble platinum precursor are mixed, and then a reduction reaction of platinum on the interface with a water-soluble reducing agent is induced.

Heat treatment may be performed after the reduction reaction.

Another embodiment of the present invention provides a membrane-electrode assembly which includes a cathode and an anode facing each other, and a polymer electrolyte membrane positioned between the anode and the cathode. The anode and the cathode include a catalyst for a fuel cell which contains a catalyst layer and an electrode supporter of a conductive substrate. The catalyst layer contains a transition element core and a surface layer that contains at least one selected from the group including platinum, a platinum-transition element alloy, and a combination thereof, and exists on the surface of the core.

Another embodiment of the present invention provides a fuel cell system which includes at least one electricity generating element which generates electricity through oxidation of hydrogen or a fuel and reduction of an oxidant, a fuel supplier for supplying hydrogen or a fuel to the electricity generating element, and an oxidant supplier for a supplying an oxidant to the electricity generating element. The electricity generating element contains the above membrane-electrode assembly and separators positioned at both sides of the membrane-electrode assembly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
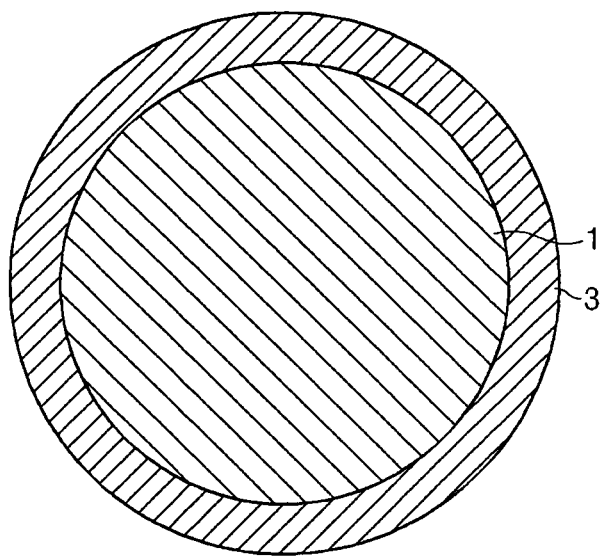
FIG. 1 is a schematic diagram illustrating a structure of a catalyst for a fuel cell according to the present invention.

The present invention relates to a catalyst having excellent efficiency that may be mainly used in a direct oxidation fuel cell. As shown in FIG. 1, the catalyst contains a transition element core 1 and a surface layer 3 that contains at least one selected from the group including platinum and a platinum-transition element alloy and exists on the surface of the core.

The transition element core may include at least one selected from the group including V, Cr, Mn, Fe, Co, Ni, Cu, Zn, Ru, Ir, W, Mo, and Rh. It is usual that a fuel cell uses the same catalyst for both a cathode and an anode, but in the present invention it is preferable that a cathode catalyst contains transition elements such as V, Cr, Mn, Fe, Co, Ni, Cu, Zn along with platinum and that an anode catalyst contains transition elements such as Ru, Ir, W, Mo, or Rh.

The platinum or platinum-transition element alloy in the surface layer may have an average particle diameter ranging from 1 to 5 nm (nanometers), and more preferably 1 to 3 nm. When the catalyst particle has a fine average particle diameter ranging from 1 to 5 nm, catalyst utilization efficiency is more improved, and resultantly cell performance characteristics can be improved.

The surface layer may have a thickness ranging from 1 to 5 nm. In the surface layer 3 of the catalyst in accordance with the present invention, the amount of platinum that composes the platinum-transition element alloy has a concentration gradient that decreases from the surface toward the core of the catalyst.

The catalyst of the present invention may be a black-type in which a catalyst is not supported on a carrier, or a supported-type in which a catalyst is supported on a carrier. In the present specification, the term "black" means that a catalyst metal is not supported on a carrier. As for the carrier, a carbon carrier or an inorganic material carrier that is generally used in a fuel cell can be used. The carbon carrier may include KETJEN black, DENKA black, VULCAN X, acetylene black, carbon nanotube, carbon nanofiber, mesophorus carbon, carbon foam, carbon aerosol, graphite, or the like. The inorganic material carrier may include alumina, silica, titania, zirconia, or the like. However, the carrier of the present invention is not limited thereto.

The catalyst of the present invention having the above structure is prepared using a novel method without a surfactant, unlike a conventional method. A platinum precursor and a reducing agent are present in an organic layer (or inorganic layer) and an inorganic layer (or organic layer) respectively. Under this condition, a reduction reaction of platinum does not occur without externally applying any physical force. Then a predetermined external force is applied to induce mixing and an instant reduction reaction at the interface of the inorganic layer and the organic layer occurs to prepare a catalyst. Such a method can be applied to preparation of small nano-particles, and therefore the particle size can be decreased by regulating a time of contact with the reducing agent.

The platinum precursor and reducing agent can be mixed in accordance with the two following methods.

First, a water-soluble platinum solution and a non-water-soluble reducing agent are mixed. In the mixing process, a reduction reaction of platinum is induced at the interface between the water-soluble platinum solution and the non-water-soluble reducing agent. The two-layered solution of the water-soluble platinum solution and non-water-soluble reducing agent are mixed by shaking at a speed of 10 to 1000 times/min (times per minute). By regulating the shaking speed, platinum ions are reduced at the surface of the reducing agent to produce a minutely sized platinum catalyst having an average particle diameter, that is, 1 to 5 nm, and a core-shell configuration.

The water-soluble platinum solution is prepared by dissolving a platinum precursor in water. The platinum precursor may include tetraamine platinum(II) chloride hydrate or hydrogen hexachloroplatinate(IV), and so on.

The non-water soluble reducing agent may include iron (Fe), chromium (Cr), cobalt (Co), nickel (Ni), copper (Cu), zinc (Zn), ruthenium (Ru), manganese (Mn), tungsten (W), iridium (Ir), vanadium (V), molybdenum (Mo), rhodium (Rh), and so on. Since iron is generally liable to be oxidized, it is commercialized in the presence of an organic solvent such as a mineral oil. In the present invention, iron in a mineral oil can be used as it is. Alternatively, uniformly and minutely sized spherical iron particles (S. J. Park, S. Kim, S. Lee, Z. G. Khim, K. Char, T. Hyeon* J. Amer. Chem. Soc. 2000, 122, 8581) or cobalt nano particles (Chem. Commun., 2001, 2212-2213) can be also used. As disclosed in the above article, an iron particle or a cobalt particle has been prepared to have a particle size of less than 5 nm by regulating its particle size.

The mixing process is preferably carried out in consideration of the characteristics of the platinum precursor. For example, when acidic hydrogen hexachloroplatinate is used, a base solution may be added and the mixing process may be carried out at a pH of 4 to 7. For the base solution, NaOH, $Na_2CO_3$, $NaHSO_4$, and so on can be used.

Subsequently, the mixture may be treated with an acid to remove the non-water-soluble reducing agent.

After filtrating the solution, heat treatment is carried out to thereby obtain a catalyst containing a transition element core and platinum-transition element alloys present on the surface of the core. When the heat treatment is performed under mild condition, a catalyst containing a transition element core and a platinum shell present on the surface of the core can be obtained. Since platinum is reduced due to oxidation of transition elements, platinum is weakly bound to the transition element core. Through the heat treatment, an alloy of platinum and a transition element at the surface of the transition element can be formed. The heat treatment can be performed at 300 to 1100° C. (Celsius), and the heat treatment time can be regulated in the range of 10 minutes to 12 hours. The heat treatment may be performed under a reducing atmosphere such as hydrogen or CO atmosphere.

Second, a water-soluble reducing agent and a non-water-soluble platinum precursor may be mixed. When the water-soluble reducing agent and the non-water-soluble platinum precursor are mixed, platinum may be prepared through a spontaneous reduction reaction by standard reduction potential. For the non-water-soluble platinum precursor, platinum (II) acetylacetonate may be used. For the water-soluble reducing agent, V, Cr, Mn, Fe, Co, Ni, Cu, Ru, Ir, W, Mo, Zn, Rh, and the like can be used.

A cathode and an anode in a fuel cell are distinguished not by materials but by roles, i.e., the anode is for oxidation of hydrogen or a fuel, and the cathode is for oxidant reduction. Therefore, a catalyst for a fuel cell of the present invention can be used for both a cathode and an anode. In other words, an anode in a fuel cell is supplied with hydrogen or a fuel and a cathode with oxidant, and the anode and cathode can produce electricity through an electrochemical reaction. The oxidation reaction of an organic fuel occurs at the anode and the reduction reaction of oxidant occurs at the cathode, causing a voltage gap between the electrodes.

The cathode and anode include a gas diffusion layer as an electrode supporter as well as a catalyst of the present invention. As for the gas diffusion layer, carbon paper, carbon cloth, or metal cloth can be used, but it is not limited thereto. The gas diffusion layer plays a role of supporting an electrode by diffusing a reaction gas and helping the gas easily approaches a catalyst layer. In addition, as for the gas diffusion layer, it is preferable to use a carbon paper, a carbon cloth, or a metal cloth that is water-repellent by being treated with a fluorine-based resin such as polyvinylidenefluoride, polytetrafluoroethylene, fluorinated ethylene propylene, polychlorotrifluoroethylene, and the like because it can protect gas diffusion efficiency from being deteriorated by water produced when a fuel cell operates.

In addition, the electrode can additionally include a microporous layer between the gas diffusion layer and the catalyst layer in order to improve the gas diffusion effect of the gas diffusion layer. The microporous layer supplies gas to the catalyst layer uniformly, and also supplies transport electrons produced in the catalyst layer to a porous polymer membrane. Generally, it may contain a conductive powder having a small particle diameter, for example carbon powder, carbon black, acetylene black, activated carbon, a nano-carbon such as carbon nano tubes, carbon nano fiber, carbon nanowire, carbon nano horns, or carbon nano rings, or the like. The microporous layer is formed by coating a composition containing a conductive powder, a binder resin, and a solvent. The binder resin may include polytetrafluoroethylene (PTFE), polyvinylidenefluoride, copolymer of polyvinylidenefluoride-hexafluoropropylene (PVdF-HFP), polyvinylalcohol, celluloseacetate, and the like. The solvent may include an alcohol such as ethanol, isopropyl alcohol, ethanol, n-propylalcohol, butanol, water, dimethylacetamide (DMAc), dimethylformamide, dimethylsulfoxide (DMSO), N-methylpyrrolidone, tetrahydrofuran, and the like. The coating process may be carried out using screen printing, spray coating, coating using a doctor blade, gravure coating, dip coating, a silk screen method, painting, and the like, depending on the viscosity of the composition, but is not limited thereto.

A polymer electrolyte membrane is positioned between the cathode and the anode to form a membrane-electrode assembly. A fuel cell system contains at least one electricity generating element, a fuel supplier, and an oxidant supplier.

The electricity generating element includes a polymer electrolyte membrane, a cathode and an anode at both sides thereof, and a separator, and plays a role of generating electricity through an electrochemical reaction such as an oxidation reaction of hydrogen or a fuel and a reduction reaction of an oxidant.

The fuel supplier plays a role of supplying the electricity generating element with a fuel including hydrogen, and the oxidant supplier plays a role of supplying the electricity generating element with an oxidant.

Figure 2:
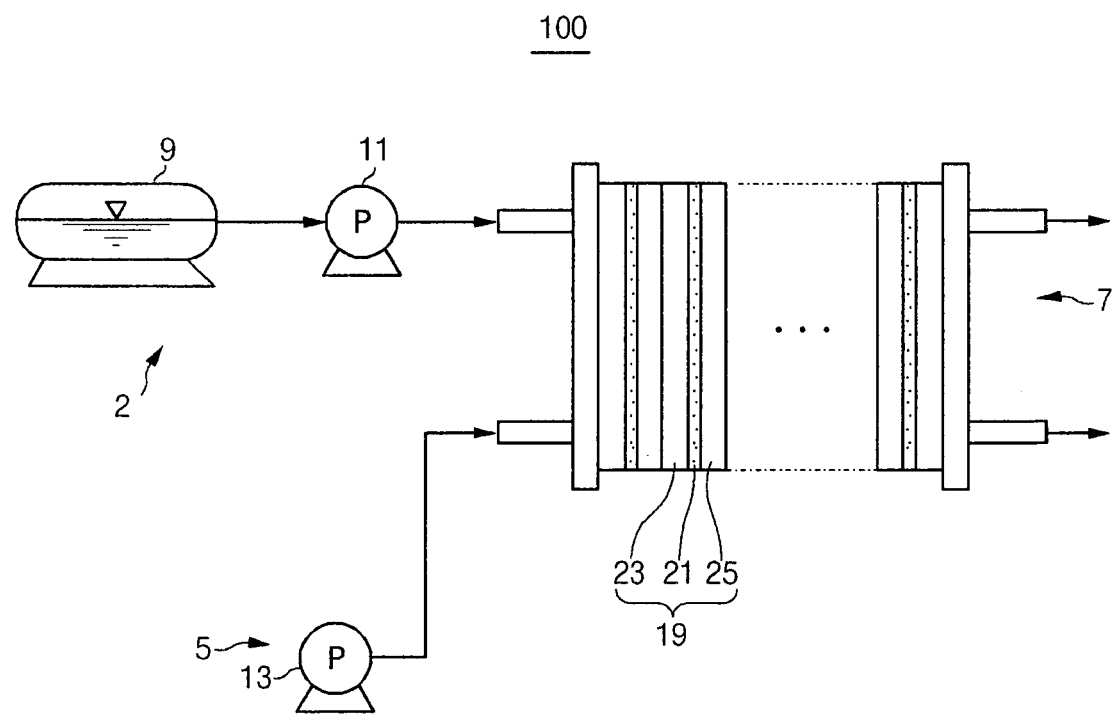
FIG. 2 is a schematic diagram illustrating a structure of a fuel cell system according to the present invention.

FIG. 2 shows the schematic structure of a fuel cell system of the present invention. A more detailed illustration is provided with reference to this accompanying drawing as follows. A fuel cell system 100 of the present invention includes a stack 7 with at least one electricity generating element 19, which can generate electrical energy, a fuel supplier 2, which supplies hydrogen or a fuel, and an oxidant supplier 5, which supplies an electricity generating element 19 with an oxidant.

In addition, the fuel supplier 2 is equipped with a tank 9, which stores fuel, and a pump 11, which is connected therewith.

The fuel pump 11 supplies a fuel stored in the tank 9 with a predetermined pumping power.

The oxidant supplier 5, which supplies the electricity generating element 19 of the stack 7 with an oxidant, is equipped with at least one pump 13 drawing in an oxidant with a predetermined pumping power.

Some such fuel cell systems use pumps to supply the fuel and/or oxidant to the electricity generating element and others supply the fuel and/or oxidant in a diffusion manner instead of by using pumps and the invention is not to be limited to any one specific fuel cell system.

The electricity generating element 19 includes a membrane-electrode assembly 21, which oxidizes hydrogen or a fuel and reduces an oxidant, and separators 23 and 25 at both sides thereof, which can supply hydrogen and the oxidant.

The following examples illustrate the present invention in more detail. However, it is understood that the present invention is not limited by these examples Example 1

Figure 3:
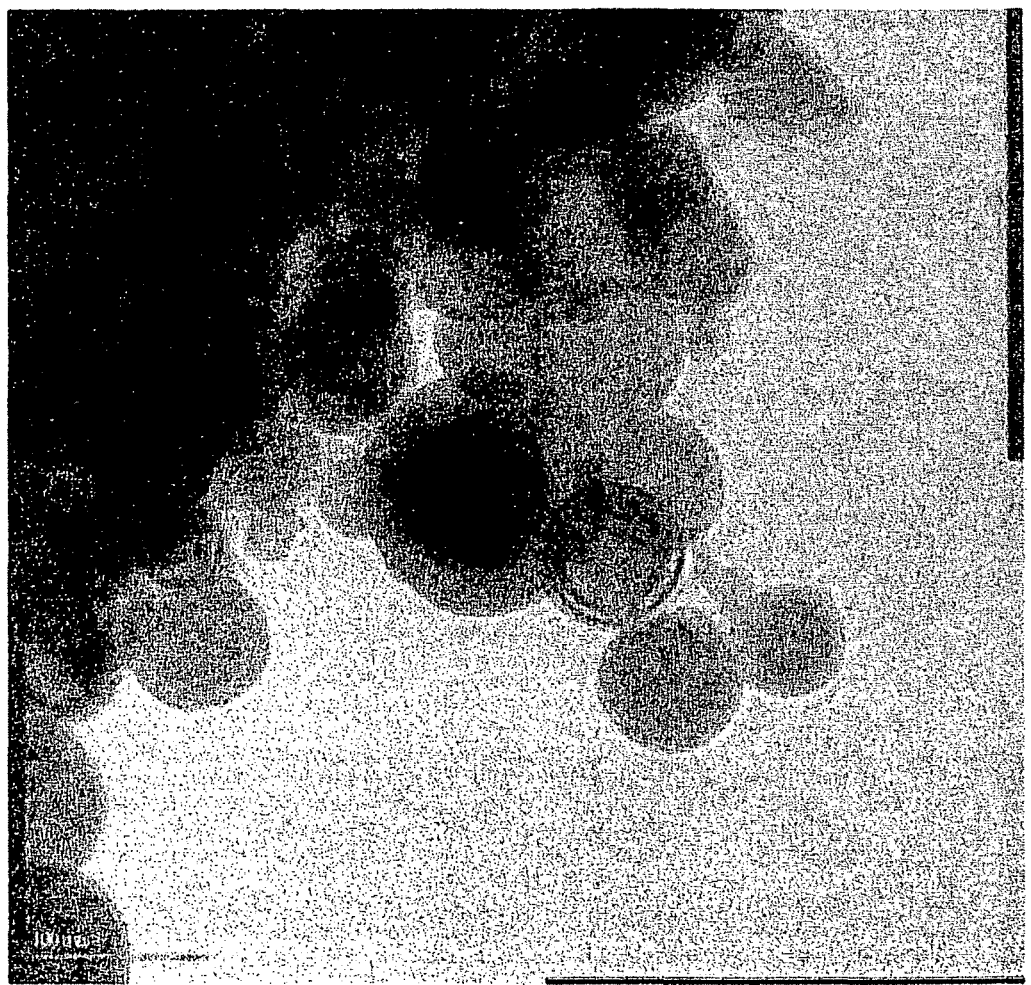
FIG. 3 is a TEM photograph of the iron particles used in Example 1 according to the present invention.

Commercially available nano-sized activated iron powders (Aldrich Company) dispersed in a mineral oil were used. A TEM photograph of the iron particles is shown in FIG. 3. As shown in FIG. 3, the particles have a significantly large size.

Figure 4A:
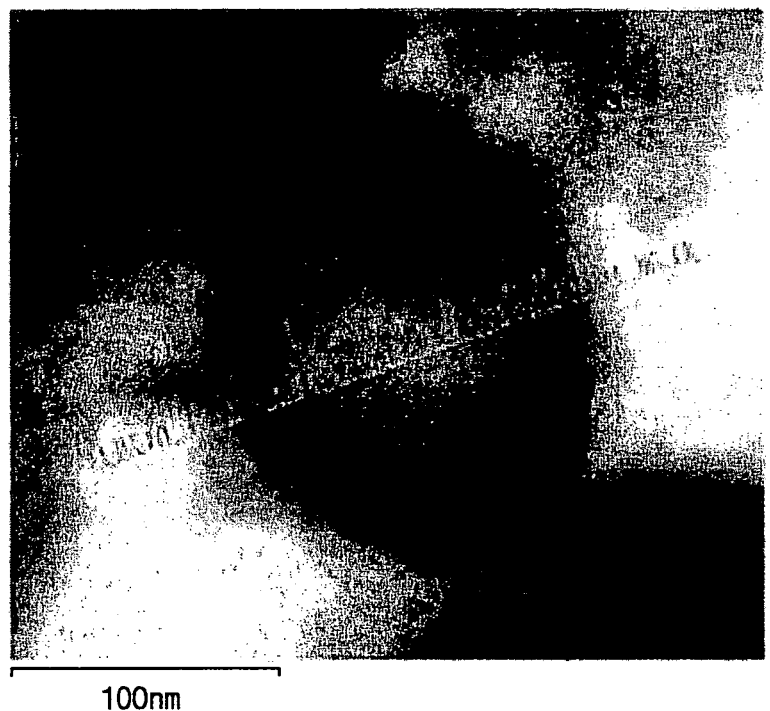
FIGS. 4A and 4B are EDX (Energy Dispersive X-ray analysis)-TEM photographs of the catalysts prepared through mechanical mixing according to Example 1 of the present invention.
Figure 4B:
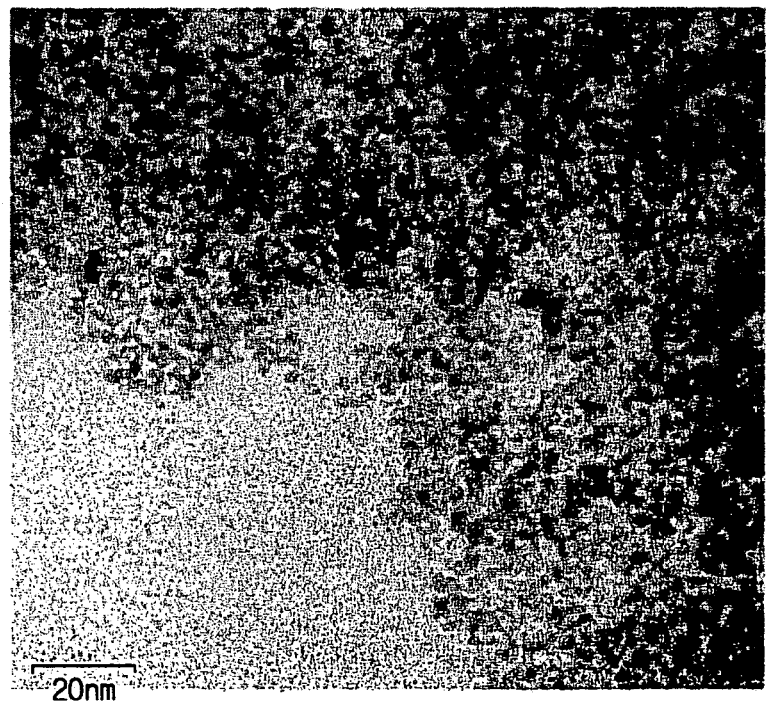

The iron powders were mechanically mixed with a tetraamine platinum(II) chloride hydrate aqueous solution in a vessel to prepare a catalyst. After mixing, an EDX-TEM photograph of the obtained catalyst is as shown in FIG. 4A. As seen from FIG. 4A, small platinum particles having a particle size of about 2 nm are present around the iron particle. As seen from FIG. 4B, platinum particles are dispersed.

A catalyst slurry was prepared using the catalyst, and it was coated on a carbon paper. UV (ultraviolet) was radiated thereto and thereby the polymer precursor was cured to prepare electrodes. The electrodes were used for a cathode and an anode, and a perfluorosulfonic acid (Nafion 112) polymer membrane was interposed therebetween followed by hot-pressing to obtain a membrane-electrode assembly.

The membrane-electrode assembly was interposed between two gaskets, and then two separators each having a gas flow channel and cooling channel with predetermined shapes were disposed at its both sides. Then, it was compressed between copper end plates to fabricate a unit cell.

Example 2

The catalyst resultant mixture was treated with 1 M sulfuric acid to produce a platinum black catalyst.

Figure 5:
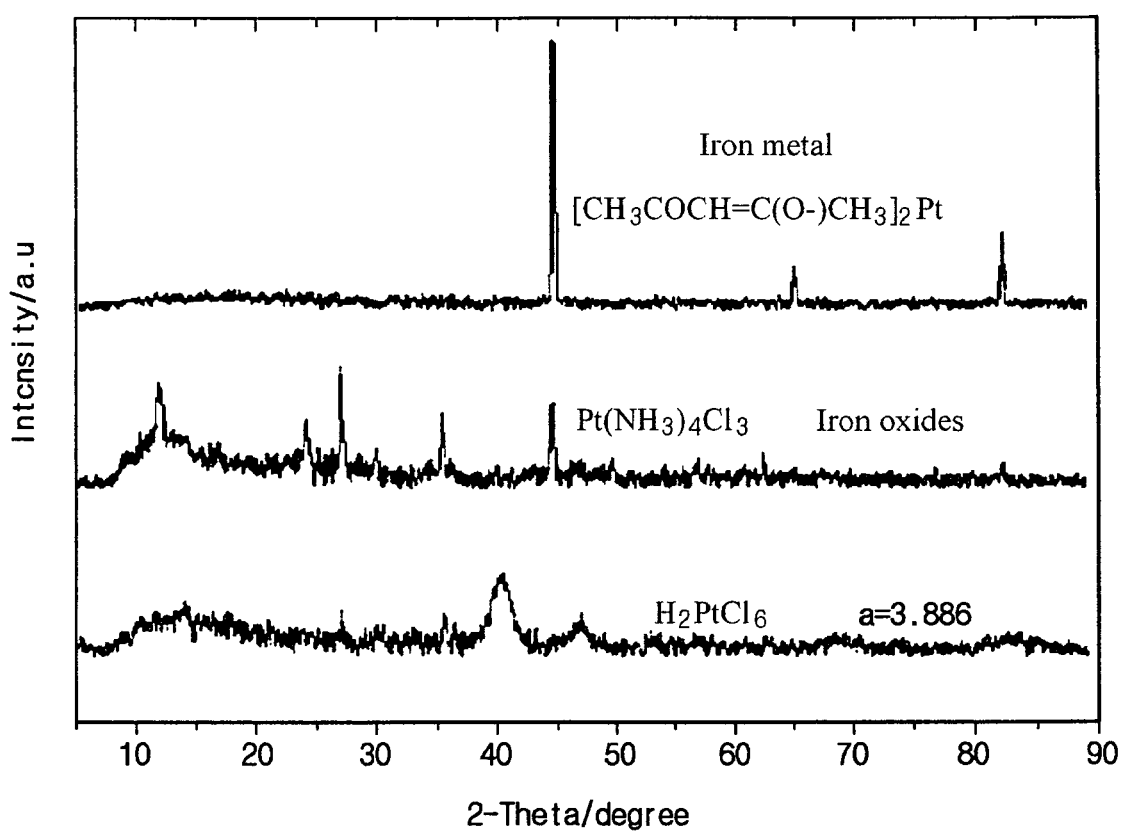
FIG. 5 is a graph showing XRD results of the catalysts prepared according to Example 2 of the present invention.

An XRD result of the obtained platinum black catalyst is shown in FIG. 5. This result shows that small-sized platinum particles are dispersed.

Using the catalyst, a unit cell was fabricated in the same manner as in Example 1.

Example 3

Commercially available nano-sized activated iron powders (ALDRICH Company) dispersed in a mineral oil were mixed with a tetraamine platinum(II) chloride hydrate aqueous solution in a vessel using a mechanical mixing.

Figure 6:
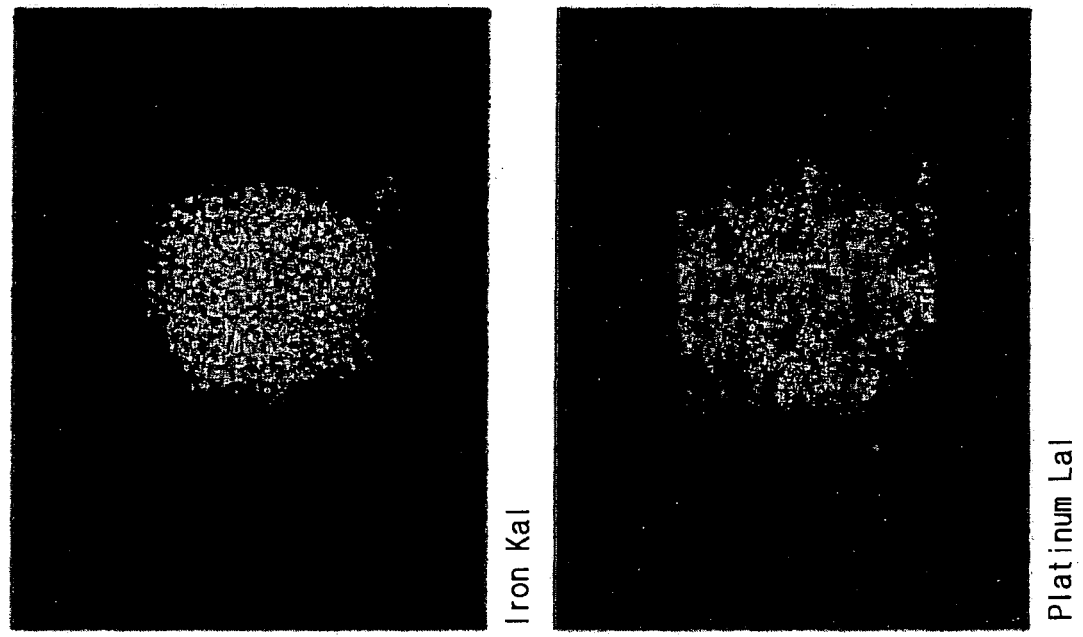
FIG. 6 is EDX-TEM photographs of the catalysts prepared through mechanical mixing according to Example 3 of the present invention.
Figure 6:
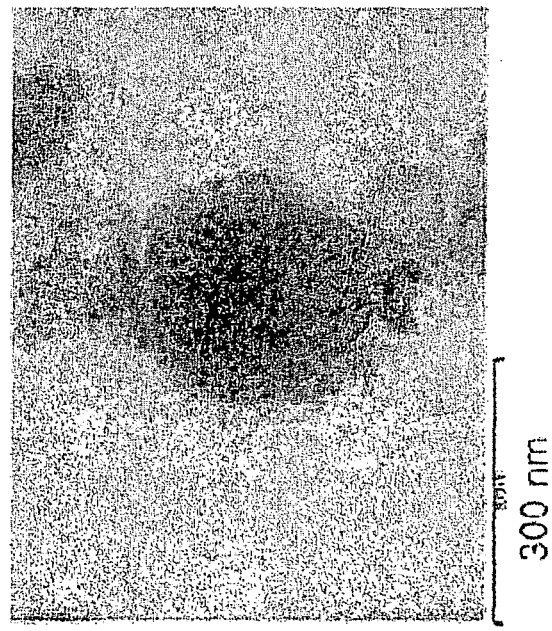
Figure 7:
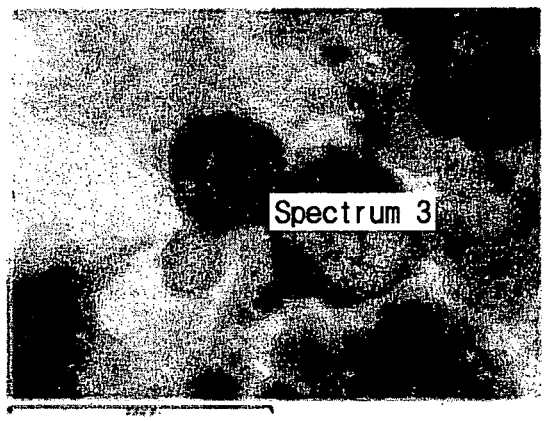
FIG. 7 is EDX-TEM photographs of the catalysts prepared through mechanical mixing according to Example 5 of the present invention.
Figure 7:
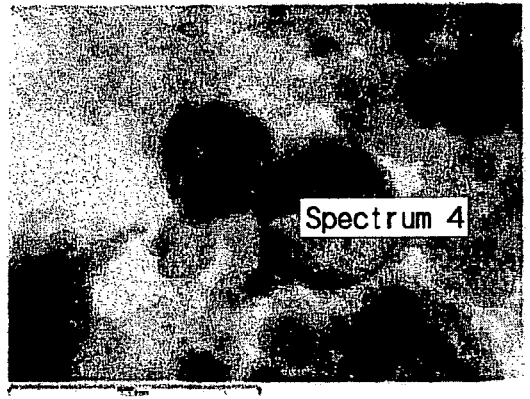
Figure 7:
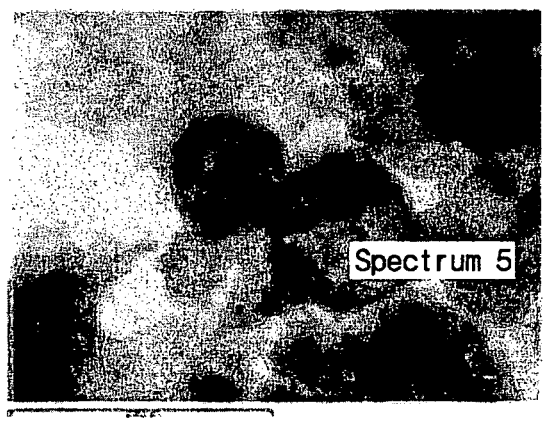
Figure 7:
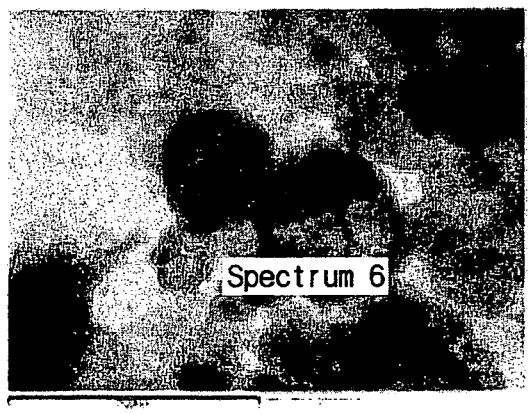

After mechanical mixing, a TEM-EDX analysis was performed on the resultant solution according to Example 3 is shown, and the result is shown in FIG. 6. TEM-EDX photographs of the resultant solution according to Example 3 are shown in FIG. 7. In FIG. 7, spectra 3 to 6 were obtained while measurement equipment was moving from the peripheral portion toward the core of the particle. The atom ratios of iron to platinum are as follows: 90.9:9.1 (Spectrum 3), 94.9:5.1 (Spectrum 4), 96.0:4.0 (Spectrum 5), and 93.6:6.4 (Spectrum 6). The atom ratio of platinum was proved to decrease as going toward the core. The results of FIGS. 6 and 7 show that platinum ions surround the iron.

The mechanically mixed solution was heat-treated at 900° C. for 1 hour under a hydrogen atmosphere to prepare a catalyst on which platinum-iron alloys were formed. Using the catalyst, a unit cell was fabricated in the same manner as in Example 1.

Figure 8:
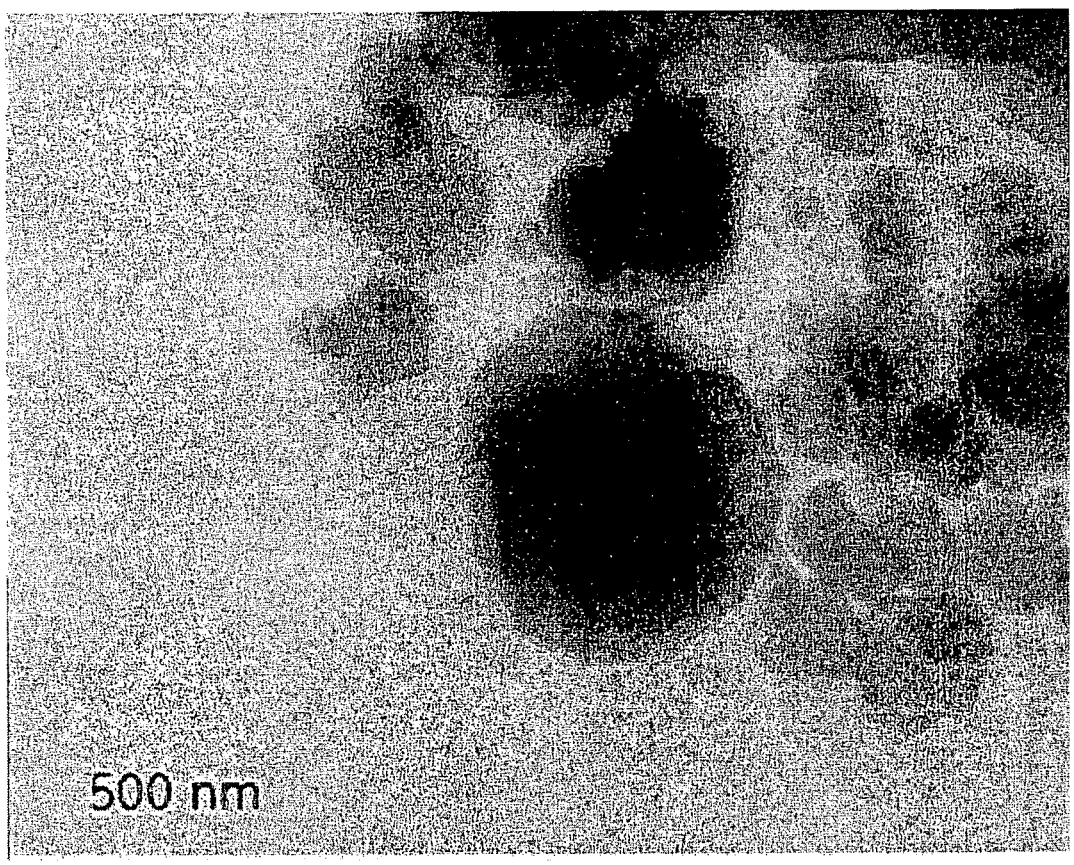
FIG. 8 is a TEM photograph of the catalyst prepared according to Example 3 of the present invention.

A TEM photograph of the catalyst is shown in FIG. 8. From FIG. 8, a haze around iron particles disappears and its circumference becomes clear.

EDX measurement results are shown in the following Table 1.

TABLE 1

| Element | wt % | atom % |
| --- | --- | --- |
| Fe K | 23.62 | 51.93 |
| Pt L | 76.38 | 48.07 |
| the entirety | 100.00 | 100.00 |

From the EDX results of Table 1, it is confirmed that platinum and iron forms an alloy.

Figure 9A:
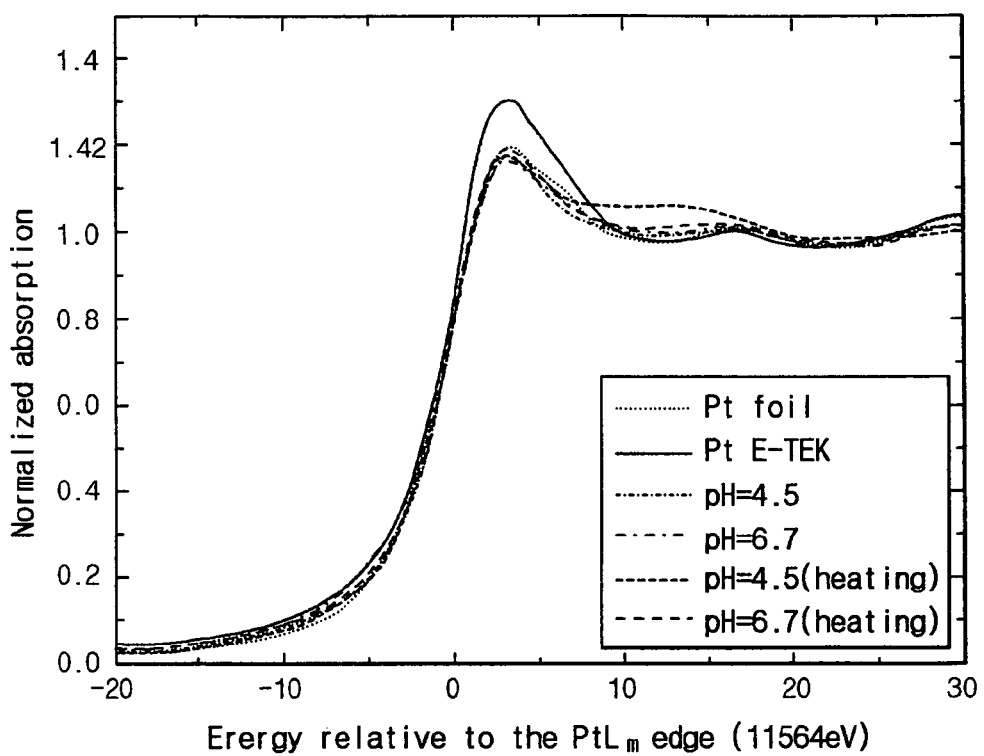
FIGS. 9A and 9B are graphs showing XANES measurement results of the catalyst prepared according to Example 3 of the present invention.
Figure 9B:
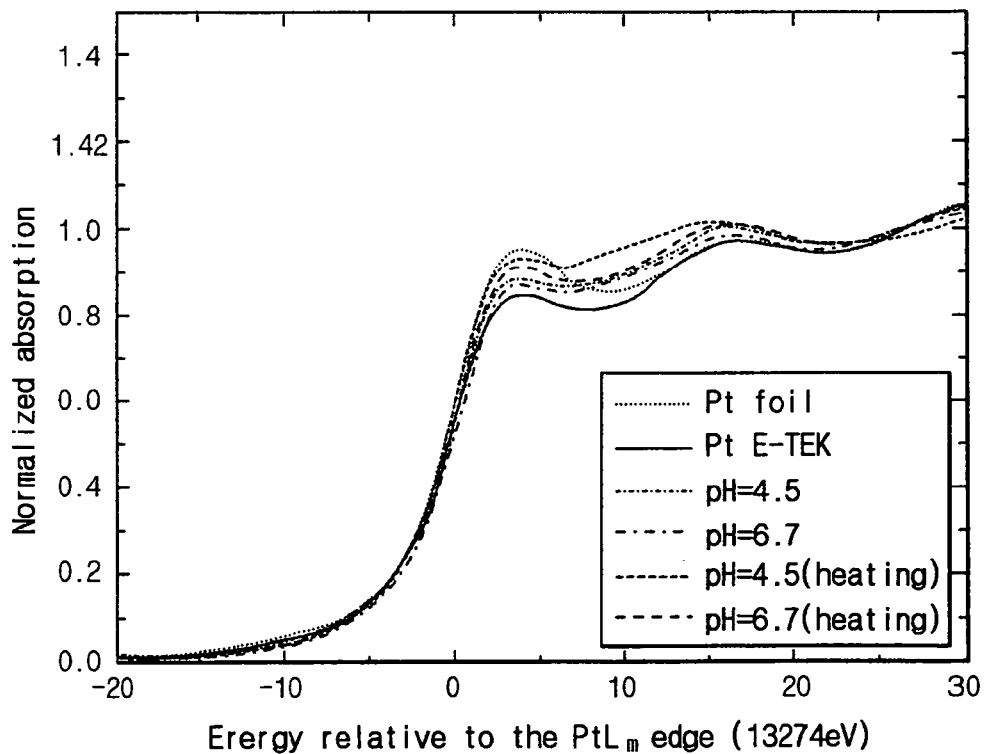

The catalyst of Example 3 was analyzed using XANES, and the measurement results are shown in FIGS. 9A and 9B. For comparison, the XANES analysis data of Pt-foil, Fe foil, Pt E-TEK, the above mechanically mixed solutions (pH 4.5 and pH 6.7), and the heated catalysts are also shown.

The d-band vacancy measurement results from the XANES analysis data are shown in Table 2.

TABLE 2

| Catalyst | d-band vacancy |
| --- | --- |
| Pt foil | 0.300 |
| Pt E-TEK | 0.344 |
| pH 4.5 | 0.302 |
| pH 6.7 | 0.300 |
| pH 4.5 (heating) | 0.327 |
| pH 6.7 (heating) | 0.313 |

The d-band vacancy values of more than 0.300 show that iron and platinum forms an alloy. XANES data of FIGS. 9A and 9B also show that iron and platinum forms an alloy.

In the present invention, a fine-sized catalyst can easily be prepared without a surfactant. The prepared catalyst has high utilization efficiency and can provide a high performance fuel cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a fuel cell, comprising:
   a transition element core comprising at least one selected from the group consisting of V, Cr, Mn, Fe, Co, Ni, Cu, Zn, W, and Mo; and
   a surface layer comprising a platinum-transition element alloy, the platinum-transition element alloy having an average particle diameter ranging from 1 to 5 nanometers, and said surface layer existing on a surface of said transition element core,
   wherein an amount of platinum in the platinum-transition element alloy has a concentration gradient that decreases from the outer surface of the surface layer toward said transition element core;
   and wherein the concentration of the transition element in the platinum-transition element alloy at the outer surface of the surface layer is greater than zero, and the concentration of the transition element at the transition element core is approximately 100%
   and further wherein the transition element in the core is the same as the transition element in the platinum-transition element alloy in the surface layer.

2. The catalyst of claim 1, wherein the platinum-transition element alloy has an average particle diameter ranging from 1 to 3 nanometers.

3. A method of preparing a catalyst of claim 1 for a fuel cell, comprising:
   mixing a water-soluble platinum solution and a non-water-soluble reducing agent, or a water-soluble reducing agent and a non-water-soluble platinum precursor; and
   inducing a reduction reaction of platinum on an interface with a water-soluble reducing agent.

4. The method of claim 3, wherein heat treatment is further performed after said reduction reaction.

5. The method of claim 3, wherein said non-water soluble reducing agent is at least one selected from the group consisting of iron, chromium, cobalt, nickel, copper, zinc, manganese, tungsten, vanadium, molybdenum, and a mixture thereof.

6. The method of claim 3, further comprising performing an acid treatment after said reduction reaction to remove a transition element core.

7. A membrane-electrode assembly comprising:
a cathode and an anode facing each other; and
a polymer electrolyte membrane positioned between said anode and said cathode,
said anode and said cathode comprising a catalyst which comprises a catalyst layer and an electrode supporter of a conductive substrate, and
said catalyst layer comprising a transition element core comprising at least one selected from the group consisting of V, Cr, Mn, Fe, Co, Ni, Cu, Zn, W, and Mo; and a surface layer that comprises a platinum-transition element alloy, the platinum-transition element alloy having an average particle diameter ranging from 1 to 5 nanometers, and said surface layer existing on a surface of said transition element core,
wherein an amount of platinum that comprises the platinum-transition element alloy includes a concentration gradient that decreases from the outer surface of the surface layer toward the transition element core of the catalyst;
and wherein the concentration of the transition element in the platinum-transition element alloy at the outer surface of the surface layer is greater than zero, and the concentration of the transition element at the transition element core is approximately 100%
and further wherein the transition element in the core is the same as the transition element in the platinum-transition element alloy in the surface layer.

8. The membrane-electrode assembly of claim 7, wherein the platinum-transition element alloy has an average particle diameter ranging from 1 to 3 nanometers.

9. A fuel cell system comprising:
at least one electricity generating element which generates electricity through oxidation of hydrogen or a fuel and reduction of an oxidant;
a fuel supplier for supplying hydrogen or a fuel to said electricity generating element; and
an oxidant supplier for supplying an oxidant to said electricity generating element,
said electricity generating element comprising:
a membrane-electrode assembly and separators positioned at both sides of said membrane-electrode assembly,
said membrane-electrode assembly comprising:
a cathode and an anode facing each other, and
a polymer electrolyte membrane positioned between said anode and said cathode,
said anode and said cathode comprising:
a catalyst which comprises:
a catalyst layer, and
an electrode supporter of a conductive substrate, and
said catalyst layer comprising:
a transition element core comprising at least one selected from the group consisting of V, Cr, Mn, Fe, Co, Ni, Cu, Zn, W, and Mo; and
a surface layer comprising a platinum-transition element alloy, the platinum-transition element alloy having an average particle diameter ranging from 1 to 5 nanometers, and said surface layer existing on a surface of said transition element core,
wherein an amount of platinum in the platinum-transition element alloy has a concentration gradient that decreases from the outer surface of the surface layer toward the transition element core of the catalyst;
and wherein the concentration of the transition element in the platinum-transition element alloy at the outer surface of the surface layer is greater than zero, and the concentration of the transition element at the transition element core is approximately 100% and further wherein the transition element in the core is the same as the transition element in the platinum-transition element alloy in the surface layer.

10. The fuel cell system of claim 9, wherein the platinum-transition element alloy has an average particle diameter ranging from 1 to 3 nanometers.

11. The fuel cell system of claim 9, wherein the platinum-transition element alloy has an average particle diameter ranging between 1 and 3 nanometers, and the transition element core for said anode comprising at least one member selected from the group consisting of, W, Mo, and combinations thereof.

12. The catalyst of claim 1, wherein the surface layer has a thickness ranging from 1-5 nm.

* * * * *